(12) United States Patent
Roether et al.

(10) Patent No.: US 7,052,095 B2
(45) Date of Patent: May 30, 2006

(54) ELECTROPNEUMATIC CONTROL VALVE WITH A BACK-UP VALVE

(75) Inventors: Friedbert Roether, Cleebronn (DE); Siegmund Deja, Freiberg (DE); Eberhard Schaffert, Leonberg (DE)

(73) Assignee: Knorr-Bremse Systeme Fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 10/475,787

(22) PCT Filed: Apr. 26, 2002

(86) PCT No.: PCT/EP02/04630

§ 371 (c)(1),
(2), (4) Date: May 10, 2004

(87) PCT Pub. No.: WO02/087949

PCT Pub. Date: Nov. 7, 2002

(65) Prior Publication Data

US 2004/0183363 A1 Sep. 23, 2004

(30) Foreign Application Priority Data

Apr. 26, 2001 (GB) ............................. 101 20 318.7

(51) Int. Cl.
*B60T 15/18* (2006.01)
*B60T 8/50* (2006.01)
(52) U.S. Cl. ....................... 303/119.2; 303/7
(58) Field of Classification Search ............. 303/36, 303/37, 44, 66, 74, 77, 80, 86, 69, 82, 118.1; 251/129.15, 129.07
See application file for complete search history.

(56) References Cited

U.S. PATENT DOCUMENTS 6,206,481 B1  3/2001  Kaisers et al. .................. 303/7

FOREIGN PATENT DOCUMENTS

| DE | 3931761 A | 4/1991 |
| DE | 19605562 A | 8/1997 |
| DE | 199 02 225 A 1 | 1/1999 |
| DE | 199918070 A | 12/1999 |

*Primary Examiner*—Chris Schwartz
(74) *Attorney, Agent, or Firm*—Crowell & Moring LLP

(57) ABSTRACT

Electropneumatic control valve for a pneumatic brake system of a vehicle, having a divided valve housing consisting of a lower relay valve housing and an upper pilot valve housing which enclose a control chamber in which an axially adjustable control piston is guided. The piston can be acted upon by way of a pilot valve arrangement accommodated in the pilot valve housing in order to switch the compressed-air flow between at least one brake line connection arranged on the relay valve housing, a supply pressure connection and as a bleeder connection by way of an interior valve seat arrangement. A control connection of a back-up valve of the pilot valve arrangement is also arranged on the relay valve housing, and by way of a valve-internal pressure medium duct is connected with the back-up magnetic valve accommodated in the pilot valve housing. Internal pressure medium ducts are arranged and sealed in a manner that allows the pilot valve housing to be produced without machining.

8 Claims, 2 Drawing Sheets

ELECTROPNEUMATIC CONTROL VALVE WITH A BACK-UP VALVE

BACKGROUND AND SUMMARY OF THE INVENTION

This application claims the priority of German application 101 20 318.7, filed Apr. 26, 2001, the disclosure of which is expressly incorporated by reference herein.

The invention relates to an electropneumatic control valve for a pneumatic brake system of a vehicle.

An electropneumatic control valve of the present invention has a divided valve housing which consists of a lower relay valve housing part and an upper pilot valve housing part which enclose a control chamber in which an axially adjustable control piston is guided. The piston can be acted upon by way of a pilot valve arrangement accommodated in the pilot valve housing part in order to switch the compressed air flow between at least one brake line connection arranged on the relay valve housing part, a supply pressure connection as well as a bleeder connection by way of an interior valve seat arrangement. In particular, the present invention relates to a special arrangement of the connections on the valve housing.

An electropneumatic control valve of this type is used inside a pneumatic brake system of a vehicle in order to control a brake pressure corresponding to the desired braking effect—definable by a foot brake pedal. For this purpose, a brake line originating from the control valve is usually connected with a brake cylinder which, in turn, generates the braking force required for the braking of the vehicle and transmits it to a disk or drum brake connected on the piston rod side of the brake cylinder. The defining of the desired pressure value for the electropneumatic control valve can take place electrically as well as pneumatically. However, the pneumatic control is mostly utilized only for safety purposes in the event of a failure of the electric control.

An electropneumatic control valve of this type is known from German Patent Document DE 39 31 761 C2. The control valve for a pneumatic brake system of a vehicle has a two-part metallic housing. A brake line connection, a supply pressure connection as well as a bleeder connection are situated on the lower relay valve housing. By way of an interior valve seat arrangement consisting of a closing element pressing against two concentric valve seats, a compressed-air flow can be switched between the exterior connections. For the switching, the closing element is axially actuated against the force of a restoring spring. The actuating of the closing element takes place by way of a large-surface control piston also arranged in the relay valve housing within a hollow space. The control piston is acted upon by way of a control pressure for the longitudinal adjustment, the control pressure being generated by way of a pilot valve arrangement. The pilot valve arrangement is arranged within a pilot valve housing mounted on the relay valve housing. For adjusting or changing the control pressure, two individual solenoid valves are used. One solenoid valve is closed in a currentless manner and communicates by way of housing-internal pressure medium ducts with the supply pressure connection which is arranged on the relay valve housing and, by way of a valve-internal pressure medium duct leading to the pilot valve housing, establishes a corresponding connection. The working connection of this solenoid valve is connected with the control chamber. The other solenoid valve is used for bleeding the control chamber and is closed in a currentless fashion. Also, on the working line side, this solenoid valve is connected with the control chamber and, on the outgoing-air side, is connected with the atmosphere by way of the bleeder connection arranged on the relay valve housing. The control pressure is changed by a coordinated energizing of both solenoid valves. This change takes place corresponding to a pressure control by means of a pressure sensor as the actual-value generator which is situated on the working chamber. In this case, the defining of the desired pressure value takes place electrically. An electronic unit integrated in the pilot valve housing corresponding controls the two solenoid valves.

It is also generally known in the prior art that, in addition to the two solenoid valves of the pilot valve arrangement which are constructed as an inlet magnetic valve as ell as an outlet magnetic valve, another solenoid valve is provided which is called a back-up valve. The back-up valve is also arranged in the pilot valve housing and is controlled by way of a control connection situated on the pilot valve housing in order to, in the event of a failure of the electronic control— for example, as a result of a line rupture—permit a pressure-medium-controlled actuating of the control valve for safety purposes. For this purpose, the control pressure arrives in the control chamber by way of the back-up valve in order to thereby, by moving the control piston, permit an actuating of the valve seat arrangement in an auxiliary manner. By means of a foot brake module provided in the pneumatic brake system, the control pressure, in a normal case, is held back in a closed energized manner by way of the back-up valve.

As a result of the additional arrangement of the back-up valve in the pilot valve housing, corresponding additional valve-internal pressure medium ducts are required. In order to implement short line paths in this case, the control connection so far had been arranged close to the location of the back-up valve on the pilot valve housing.

However, this arrangement of the control connection leads to increased processing expenditures of the pilot valve housing. In particular, machining operations are required in order to produce the control connection.

It is an object of the present invention to further improve an electromagnetic control valve of the above-described type such that the manufacturing expenditures in the housing area are lowered.

This object is achieved by an electropneumatic control valve having a divided valve housing which consists of a lower relay valve housing and an upper pilot valve housing which enclose a control chamber, in which an axially adjustable control piston is guided. The adjustable control piston can be acted upon by way of a pilot valve arrangement accommodated in the pilot valve housing in order to switch the compressed-air flow between at least one brake line connection arranged on the relay valve housing, a supply pressure connection and a bleeder connection by way of an interior valve seat arrangement. The control connection of a back-up valve of the pilot valve arrangement is arranged on the relay valve housing, and by way of a valve-internal pressure medium duct is connected with the back-up valve in order to create a pilot valve housing which can be produced without machining.

The invention includes the technical teaching that the control connection of the back-up valve of the pilot valve arrangement is arranged on the body of the relay valve housing and is connected by way of a valve-internal pressure medium duct with the back-up valve accommodated on the pilot valve housing.

The advantage of this measure is the fact that now a no-machining manufacturing of the pilot valve housing becomes possible. Any machining operations are required only on the relay valve housing. The no-machining pilot valve housing can therefore be cast in a finished manner.

Originating from the control connection in the relay valve housing, the valve-internal pressure medium duct is guided by way of a sealing ring arranged in the connection area to the pilot valve housing through the pilot valve housing to the back-up valve. The pressure medium duct can be formed directly during the casting without the requirement of an additional subsequent machining or the like.

The sealing ring may, for example, simply be shaped as an O-ring. During the assembling of the control valve the O-ring can be inserted into corresponding groove-type recesses in the connection area between the relay valve housing and the pilot valve housing.

According to a measure improving the invention, the sealing ring can be constructed such that, in addition to sealing off the valve-internal pressure medium duct, it can also provide a sealed connection between the relay valve housing and the pilot valve housing. This function-integrated sealing ring is easy to handle and simplifies the assembly of the control valve.

Other objects, advantages and novel features of the present invention will become apparent from the following detailed description of the invention when considered in conjunction with the accompanying drawings.

DETAILED DESCRIPTION OF THE DRAWINGS

Figure 1:
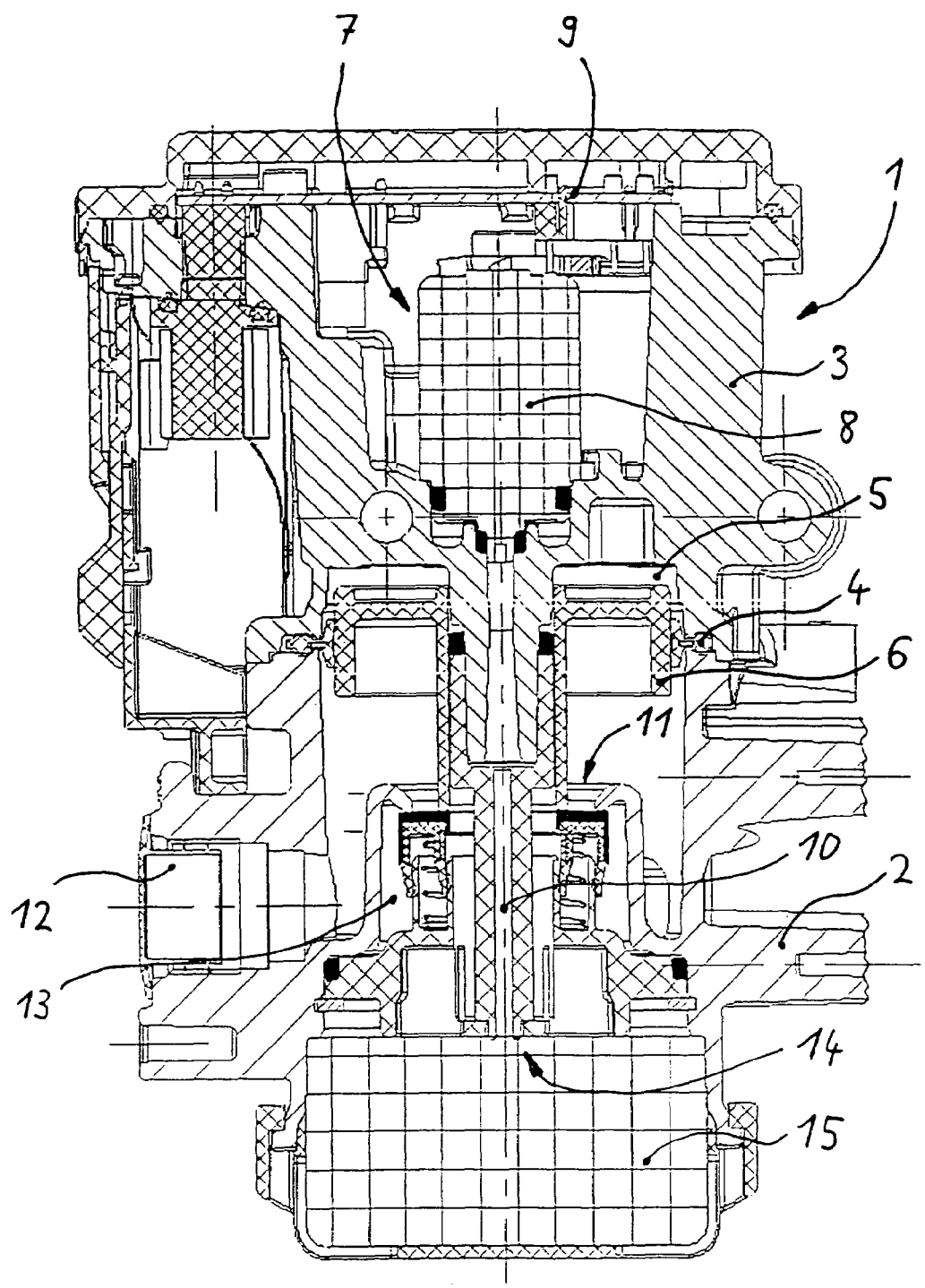
FIG. 1 is a longitudinal sectional view of an electropneumatic control valve in accordance with an embodiment of the present invention.

According to FIG. 1, the electropneumatic control valve has a two-part valve housing 1 which consists of a lower relay valve housing 2 and an upper pilot valve housing 3. The pilot valve housing 3 is screwed to the relay valve housing 2 with a sealing ring 4 situated in-between. The relay valve housing 2 and the pilot valve housing 3 enclose an interior control chamber 5 in which a control piston 6 is axially movably arranged. For the axial adjusting of the control piston 6, a pilot valve arrangement 7 is used which is housed in the pilot valve housing 2 and of which only a pilot valve is visible here which is used as an outlet valve 8. The pilot valve arrangement 7 is electrically controlled by way of an electronic unit 9 also arranged in the pilot valve housing 3. The illustrated pilot valve has a bleeding effect when the control chamber 5 is actuated, in which case the outgoing air is discharged to the atmosphere by way of a bleeder duct 10. In addition to the outlet valve 8, a second pilot valve is provided as the inlet valve which is used for admitting a control pressure to the control chamber 5, which control pressure is defined by the electronic unit 9, in order to actuate the control piston.

When the control chamber 5 is acted upon, the control piston 6 actuates a valve seat arrangement 11 by way of a lower sleeve-type coaxial extension. The valve seat arrangement 11 switches the compressed-air flow between an brake line connection 12 arranged on the relay valve housing 2, on the one hand, and a feeding pressure connection (not visible here), which is connected with an internal supply pressure chamber 13, as well as a bleeder connection 14. The bleeder connection 14 is additionally provided with a sound absorber 15 for reducing the sound of the outflowing air.

Figure 2:
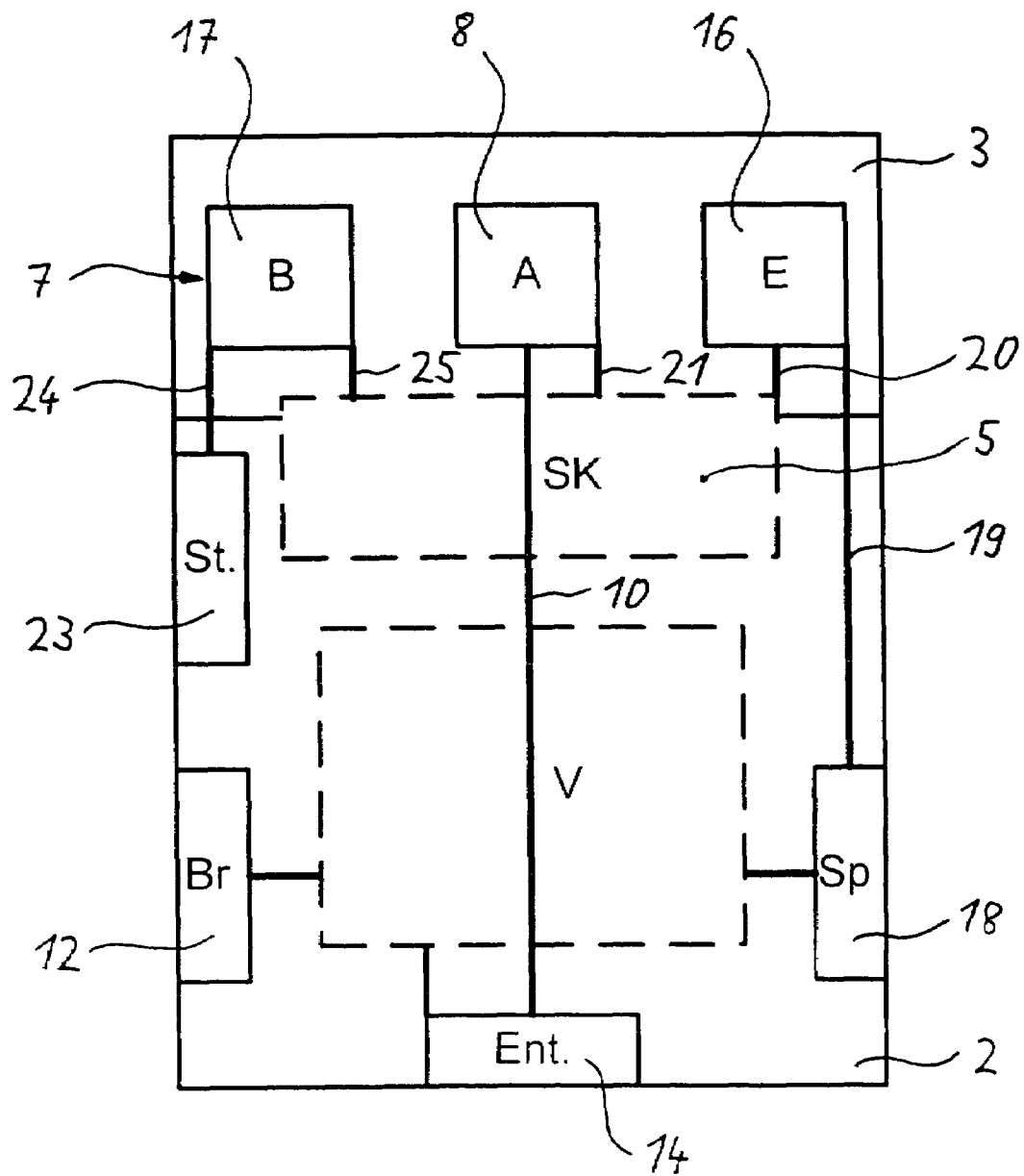
FIG. 2 is a schematic representation of the arrangement of all valve-internal pressure medium ducts in the embodiment illustrated in FIG. 1.

According to the schematic representation of FIG. 2, in addition to the outlet valve 8, an inlet valve 16 as well as a back-up valve 17 are arranged in the pilot valve housing 3. A pressure medium duct 19 leads from the supply pressure connection 18 arranged on the relay valve housing 2 to the inlet magnetic valve 16 which, on the working line side, is connected by way of a pressure medium duct 20 with the control chamber 5. A bleeding of the control chamber 5 takes place by way of a pressure medium duct 21 which, for this purpose, is connected to the outlet magnetic valve 8 and, on the outgoing-air side, is connected by way of the bleeder duct 10 with the bleeder connection 14. A control connection 23 for the back-up valve 17 is also arranged on the relay valve housing 2. A pressure medium duct 24 extends from the control connection 23 to the back-up valve 17 which is connected by way of a pressure medium duct 25 with the control chamber 5 in order to permit a valve control by way of the control connection 23 in the event of a failure of the electric control for the inlet magnetic valve 16 and the outlet magnetic valve 8.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Electropneumatic control valve for a pneumatic brake system of a vehicle, having a divided valve housing which includes a lower relay valve housing and an upper pilot valve housing which enclose a control chamber in which an axially adjustable control piston is guided which can be acted upon by way of a pilot valve arrangement accommodated in the pilot valve housing in order to switch compressed-air flow between at least one brake line connection arranged on the relay valve housing, a supply pressure connection and a bleeder connection by way of an interior valve seat arrangement, wherein a control connection of a back-up valve of the pilot valve arrangement is arranged on an outer surface of the relay valve housing, and by way of a valve-internal pressure medium duct is connected with the back-up valve accommodated in the pilot valve housing, in a manner which permits the pilot valve housing to be produced without machining.

2. Electropneumatic control valve according to claim 1, wherein, originating from the control connection in the relay valve housing, the valve-internal pressure medium duct extends by way of a sealing ring arranged in the connection area to the pilot valve housing through the pilot valve housing to the back-up valve.

3. Electropneumatic control valve according to claim 2, wherein the sealing ring is constructed as an O-ring assigned to the pressure medium duct.

4. Electropneumatic control valve according to claim 2, wherein, in addition to being used for sealing off the valve-internal pressure medium duct, the sealing ring is also used for the sealed-off connection of the relay valve housing with the pilot valve housing.

5. An electropneumatic control valve for a pneumatic brake system of a vehicle, comprising:
   a divided valve housing, wherein the valve housing includes a lower relay valve housing and an upper pilot valve housing; and
   a control piston slidably disposed within a control chamber in the valve housing, said control piston adapted to be actuated by a pilot valve arrangement disposed in the pilot valve housing in order to actuate an interior valve seat arrangement in the relay valve housing to switch compressed air flow between a brake line connection arranged on the relay valve housing, a supply pressure connection and a bleeder connection,
   wherein a control connection for a back-up valve of the pilot valve arrangement is arranged on an outer surface of the relay valve housing, and the control connection communicates with the back-up valve by way of a valve-internal pressure medium duct.

6. An electropneumatic control valve according to claim 5, wherein the valve-internal pressure medium duct between the control connection in the relay valve housing and the back-up valve passes through a connection area between the relay valve housing and the pilot valve housing and is sealed by a sealing ring.

7. An electropneumatic control valve according to claim 6, wherein the sealing ring is an O-ring.

8. An electropneumatic control valve according to claim 6, wherein the sealing ring sealing off the valve-internal pressure medium duct, also seals connection area of the relay valve housing with the pilot valve housing.

* * * * *